US008825729B1

(12) United States Patent
Cope et al.

(10) Patent No.: US 8,825,729 B1
(45) Date of Patent: Sep. 2, 2014

(54) POWER AND BANDWIDTH EFFICIENT FFT FOR DDR MEMORY

(75) Inventors: Benjamin Thomas Cope, London (GB); Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 567 days.

(21) Appl. No.: 13/236,081

(22) Filed: Sep. 19, 2011

(51) Int. Cl.
*G06F 15/00* (2006.01)

(52) U.S. Cl.
USPC .......................................................... 708/404

(58) Field of Classification Search
CPC ..... G06F 17/142; G06F 7/768; G06F 17/141; G06F 9/30014; G06F 9/30036; G06F 17/14; G06F 17/10; H04L 27/265; H04L 27/2628
USPC ................................................. 708/404, 409
See application file for complete search history.

(56) References Cited

U.S. PATENT DOCUMENTS 6,058,409 A * 5/2000 Kozaki et al. ................. 708/404
2005/0182806 A1 * 8/2005 Krishnamoorthi et al. ... 708/404

* cited by examiner

*Primary Examiner* — Tan V. Mai
(74) *Attorney, Agent, or Firm* — Ropes & Gray LLP

(57) ABSTRACT

Systems and methods are disclosed for calculating Fast Fourier Transforms (FFT) in a power and memory bandwidth efficient manner. For example, an apparatus is provided that includes a memory interface operable to read data samples stored in a memory and store a first set of the data samples in a read reorder buffer, wherein the read reorder buffer selects a first portion of the first set of the data samples in accordance with a radix-reversed order. Also included is a first core circuit that is operable to process the first portion of the first set of the data samples in response to receiving the first portion from the read reorder buffer, wherein the processing includes calculating output samples corresponding to a part of an FFT.

20 Claims, 8 Drawing Sheets

| 0 | R | 2R | ... | N-4R | N-3R | N-2R | N-R |
|---|---|---|---|---|---|---|---|
| 1 | R+1 | 2R+1 | ... | N-4R+1 | N-3R+1 | N-2R+1 | N-R+1 |
| 2 | R+2 | 2R+2 | ... | N-4R+2 | N-3R+2 | N-2R+2 | N-R+2 |

FIG. 6A

| N-3R | N-3R+1 | N-3R+2 | ... | N-2R-4 | N-2R-3 | N-2R-2 | N-2R-1 |
|---|---|---|---|---|---|---|---|
| N-2R | N-2R+1 | N-2R+2 | ... | N-R-4 | N-R-3 | N-R-2 | N-R-1 |
| N-R | N-R+1 | N-R+2 | ... | N-4 | N-3 | N-2 | N-1 |

POWER AND BANDWIDTH EFFICIENT FFT FOR DDR MEMORY

BACKGROUND OF THE DISCLOSURE

This disclosure relates to systems and methods for providing power and bandwidth efficient Fast Fourier Transform (FFT) architectures in a device, for example, an application-specific standard product (ASSP), an application-specific integrated circuit (ASIC), a field programmable gate array (FPGA), a full-custom chip, or a dedicated chip.

There are many well known FFT algorithms, such as the Constant Geometry FFT algorithm, the Cooley-Tukey FFT algorithm, the Prime-Factor FFT algorithm, Bruun's FFT algorithm, Rader's FFT algorithm, or Bluestein's FFT algorithm, which each lends itself to hardware implementation. Although the embodiments disclosed herein are primarily discussed within the context of the Constant Geometry FFT algorithm for clarity, other FFT algorithms, or variants thereof, may also be used.

An FFT calculation includes reading an input data sequence with data samples $x[n]$, $n=0, \ldots, N-1$, where N is the length of the input data sequence, and outputting the frequency domain FFT data sequence with data samples $X[k]$, $k=0, \ldots, N-1$. Such a calculation is conventionally called an N-point FFT. FFT algorithms use a divide and conquer approach to reduce the computational complexity of calculating an FFT. For example, the Cooley-Tukey algorithm recursively decomposes the problem of calculating the FFT into two sub-problems of half the size (i.e., N/2) at every intermediate pass. The size of the FFT decomposition is known as the radix. In the above example, the radix is 2. This decomposition approach generally works provided that N is a power of 2. Thus, calculating an FFT typically involves making a number of passes (also referred to as stages) over the input data sequence and intermediate results. In general, each pass can be associated with a different radix.

A number of applications have emerged recently that make use of long length FFTs. However, programmable devices typically have a relatively limited amount of on board memory to support such long length FFT calculations. For example, a 1 million point double precision floating point FFT requires 128 million bits of data memory for the storage of one pass of the FFT. Therefore, external memory may be required for storing data required for calculating these types of FFTs.

Many current FFT implementations utilize external memory, e.g., Static Dynamic Random Access Memory (SDRAM) which is generally inexpensive, for storing the data required for calculating the FFT. Conventional implementations access read data from the external memory in an out of order fashion. This can be inefficient in terms of power consumption and memory bandwidth when SDRAM is used. Other FFT implementations may utilize Reduced-Latency Dynamic Random Access Memory (RLDRAM) or Quad Data Rate Static Random Access Memory (QDRSRAM) memories. Accessing read data in an out of order fashion is not as inefficient when RLDRAM and QDRSRAM are used; however, RLDRAM and QDRSRAM are generally expensive. In addition, regardless of the type of external memory used, I/O and memory interface bandwidth resources, required to utilize the external memory, may be expensive. One of the challenges in FFT implementations is the handling of data from memory in a manner that scales well as the FFT length increases.

As an example, consider the calculation of a 64-point FFT using the radix $R=4$. For computing the FFT, an FFT processor conventionally processes the input data sequence in the order where the indices corresponding to the data samples are arranged in the following order:
00, 16, 32, 48, 01, 17, 33, 49, 02, 18, 34, 50, 03, 19, 35, 51, 04, 20, 36, 52, . . . , 15, 31, 47, 63.

This order of data samples is referred to as a radix-reversed order. In the first pass of the FFT calculation, data samples corresponding to indices 00, 16, 32, and 48 are used to compute a first radix-4 butterfly; data samples corresponding to indices 01, 17, 33, and 49 are used to compute the next radix-4 butterfly; and so on. An FFT butterfly is a portion of the FFT calculation that breaks up the larger FFT calculation into smaller sub-transform calculations. Each radix-R butterfly may itself be an FFT of size R. From the point of view of the utilization of the memory interface processing the input data sequence in the radix-reversed order is inefficient in terms of both power and bandwidth because reading the input data sequence in the radix-reversed order requires accessing data from external memory in an out-of-order memory access pattern. In addition, although reading data samples requires out-of-order accesses to external memory, the final FFT calculation results are still written to memory in a sequential pattern.

Accessing the input data sequence from external memory can be inefficient because row change overheads are incurred in accessing data from external memory, particularly from SDRAM memory. Specifically, rows in the external memory must be activated and pre-charged before they can be read from or written to which causes inefficiencies. Moreover, consecutive accesses to two different rows in the same memory bank of the external memory also lead to inefficiencies.

SUMMARY OF THE DISCLOSURE

To address the above and other shortcomings within the art, methods and systems according to the present invention provide power and bandwidth efficient FFT architectures.

One approach for improving the efficiency of accessing data from external memory, especially in applications that have predictable memory access patterns, is to organize the data stored in external memory in such a manner that the overhead involved in accessing data from one row of external memory can be masked behind the process of accessing data from another row of external memory. From the description in preceding paragraphs, it will be apparent that calculating the FFT is an application that can have a predictable memory access pattern. Techniques for organizing the input data samples for FFT calculations in external memory, which are described in greater detail in related U.S. patent application Ser. No. 12/910,423, filed Oct. 22, 2010, which is hereby incorporated by reference herein in its entirety, can mitigate the memory inefficiencies during FFT calculations with respect to power and bandwidth usage.

The present disclosure optimizes read memory accesses by limiting out of order memory accesses during each pass of an FFT calculation. The Constant Geometry FFT algorithm is an attractive choice for implementing an FFT because the read sequence, i.e., the order in which the input data sequence or the sequence of intermediate results is read, remains identical from pass to pass. It follows that the same hardware architecture may be used to implement all passes of the FFT. Moreover, since the read sequence is identical for each pass in the Constant Geometry algorithm, only one read translation optimization needs to be developed.

In one embodiment, the system includes a memory interface and a first core circuit. The system further includes a first read reorder buffer operable to select a portion of the data samples stored in the first read reorder buffer by the memory interface and transmit the selected portion of data samples to the first core circuit. The first core circuit is further operable to process the received data samples to calculate output data samples corresponding to a part of a first FFT. In an embodiment, the first core circuit may be a first programmable logic device (PLD) core circuit or any other general processing circuitry.

In another embodiment, the system includes a first read reorder buffer and a second read reorder buffer. The system also includes a first core circuit and a second core circuit. The second read reorder buffer is operable to select a portion of the data samples stored in the second read reorder buffer by the memory interface and transmit the selected portion of data samples to the second core circuit. The second core circuit is further operable to process the received data samples to calculate a part of a second FFT. The first read reorder buffer and the first core circuit operate in tandem with the second read reorder buffer and the second core circuit to calculate the first FFT and the second FFT in an interleaved manner.

In another embodiment, the system includes an output reorder buffer operable to output data samples corresponding to a part of the FFT calculated by a core circuit in a natural order. The system also includes a multiplexer operable to either select data samples processed by the core circuit or data from an external data source.

In yet another embodiment, the system includes an intermediate reorder buffer and an output reorder buffer. The intermediate reorder buffer and the output reorder buffer are both operable to receive output data samples corresponding to a part of the FFT calculated by a core circuit. The core circuit is operable to calculate the FFT using more than two passes. The intermediate reorder buffer is further operable to receive data samples corresponding to a part of the FFT calculated by the core circuit and in the last pass partially reorder the data so that it can be output in natural order with additional use of the output reorder buffer.

Advantageously, the above embodiments in accordance with the present invention allow the construction of an FFT architecture that can compute the FFT in a power and memory bandwidth efficient manner.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which:

FIG. 6A is a schematic showing the first few indices read in the computation of an FFT in accordance with one embodiment of the present invention;

FIG. 6B is a schematic showing the last few indices written in the computation of an FFT in accordance with one embodiment of the present invention;

DETAILED DESCRIPTION OF THE INVENTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
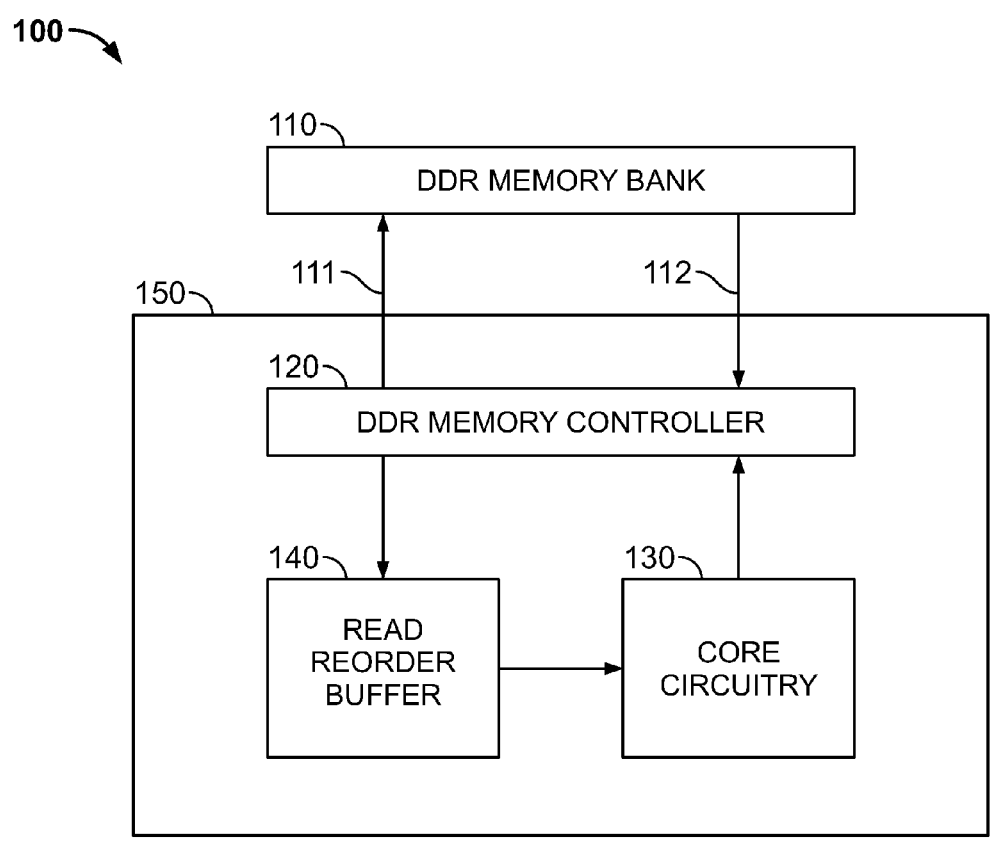
FIG. 1 is a simplified block diagram of an illustrative embodiment of an FFT computation architecture in accordance with one embodiment of the present invention.

FIG. 1 is a simplified block diagram of an illustrative embodiment of an FFT computation architecture in accordance with one embodiment of the present invention. FIG. 1 illustrates an exemplary system 100 for power and bandwidth efficient FFT computation where the input data sequence for which an FFT is to be calculated may be stored in a Double Data Rate (DDR) memory bank 110 in accordance with some embodiments of the present invention. In some embodiments, at least some components of system 100 may be located on an integrated circuit 150. Integrated circuit 150 can be an application-specific integrated circuit (ASIC), a programmable logic device (PLD), a field programmable gate array (FPGA), or a chip. It should also be understood that integrated circuit 150 may be a combination of devices, such as a FPGA and an ASIC, and/or may include additional, stand-alone circuit components. In some embodiments, the DDR memory bank 110 may be external to integrated circuit 150. Integrated circuit 150 includes DDR memory controller 120, core circuitry 130, and read reorder buffer 140. Core circuitry 130 can be general purpose programmable circuitry of any of several known types and constructions. Although, for clarity, the embodiments disclosed herein are primarily discussed within the context of a power and bandwidth efficient FFT computation architectures provided on an integrated circuit, such FFT computation architectures can be provided in and/or on any suitable programmable or non-programmable device such as, for example, a PLD, an FPGA, an application-specific standard product (ASSP), an ASIC, a full-custom chip, or a dedicated chip. In an embodiment, core circuitry 130 may be PLD core circuitry or any other general processing circuitry.

DDR memory controller 120 may be coupled to DDR memory bank 110. Examples of DDR memory bank 110 that may be supported include SDRAM, or higher cost RLDRAM or QDRSRAM. Many variants of external memories (e.g., DDR memory bank 110) can also be supported by the FFT architectures disclosed herein.

DDR memory bank 110 may be divided into a number of memory banks, each of which may further contain a plurality of cells that may be arranged in an array of rows and column groups. Each column group in a given row may include a plurality of individual memory bit circuits, each of which may store one or more bits. Therefore, each cell can store a plurality of bits. Additionally, the bit width of each column group, which is defined as the number of bits contained in the individual memory bit circuits contained in a column group, may be substantially equal to an integer multiple of the memory's minimum burst size (denoted minimum_read_burst). The minimum burst size is the smallest addressable unit of memory which can be read or written in one transaction. For example, a typical value for DDR3 SDRAM memory may be 8 beats of 64-bit words (i.e., 8 groups of 64 bits).

A minimum unit of transfer for an application running on integrated circuit 150 is the smallest number of data bits that an application operates on at a given point. In some embodiments, a minimum unit of transfer for an application running on integrated circuit 150 may be a fixed number of bits; for example, 64 bits for applications that compute single precision FFTs, or as another example, 128 bits for applications that compute double precision FFTs. In particular, for applications that require an FFT computation, the input data sequence stored in DRR memory bank 110, i.e., x[n], n=0, . . . , N−1, for which an FFT is to be computed, has N data samples, each of which has data size corresponding to the minimum unit of transfer for the application. The FFT application requires at least one data sample x[n] for operation at any point. As discussed above, each data sample x[n] may be associated with a corresponding numerical index used for memory addressing.

In some embodiments, DDR memory controller 120 includes buses 111 and 112 which may be used to exchange data between DDR memory controller 120 and DDR memory bank 110. In some embodiments, the number of bits transferrable across each of buses 111 and 112 at a time may be configurable. In some embodiments, buses 111 and 112 may be the same set of bi-directional physical wires. In an embodiment, bus 111 may be used to transmit a read address command from DDR memory controller 120 to DDR memory bank 110 and bus 112 may be used to transmit the requested data read from DDR memory bank 110 to DDR memory controller 120. In another embodiment, DDR memory controller 120 may use bus 111 to write data to DDR memory bank 110. In some embodiments, buses 111 and 112, together with DDR controller 120, may be referred to as a memory interface.

In some embodiments, DDR memory controller 120 may operate at a 533 MHz clock speed and may complete two data transfers per clock cycle with a 64 bit interface (i.e., the number of bits transferrable across each of buses 111 and 112 at a time is 64 bits). In this case, if core circuitry 130 is operating at a 266 MHZ clock speed, then using DDR memory controller 120, on average 128 bits can be read and 128 bits can be written at every clock cycle operating at maximum efficiency. In some embodiments, DDR memory controller 120 may operate at a 266 MHz clock speed for double precision data paths.

DDR memory controller 120 may also include other buses for loading (i.e., inputting) and unloading (i.e., outputting) data. The relevant instructions for loading data or unloading data, also referred to as data load or data unload addressing, may be multiplexed into DDR memory controller 120 by means of a multiplexer. For simplicity, these buses and the multiplexer are not shown. In other embodiments, the number of bits transferrable across each of these buses at a time may be configurable.

Core circuitry 130 may be configurable to calculate an FFT and output the final or intermediate data corresponding to the result of the FFT calculation to DDR memory controller 120. In some embodiments, core circuitry 130 may be programmable to calculate an FFT using a radix R. In some embodiments, core circuitry 130 may be programmable to calculate an FFT where radix R is not identical for each pass of the FFT calculation. DDR memory controller 120 may further write and/or store the final or intermediate FFT calculation data to DDR memory bank 110 or may unload the FFT calculation data to other internal or external memory structures or buffers. For simplicity, these other internal or external memory structures or buffers are not shown in FIG. 1.

System 100 also includes read reorder buffer 140. Read reorder buffer 140 is connected to DDR memory controller 120. Read reorder buffer 140 is also connected to core circuitry 130. In an embodiment, read reorder buffer 140 has a size that is at least large enough to store R*minimum_read_burst data samples, where R is the radix, as discussed above. Read reorder buffer 140 may include additional circuitry (not shown) that is used to assist it in selecting and transmitting portions of data stored within.

Figure 2:
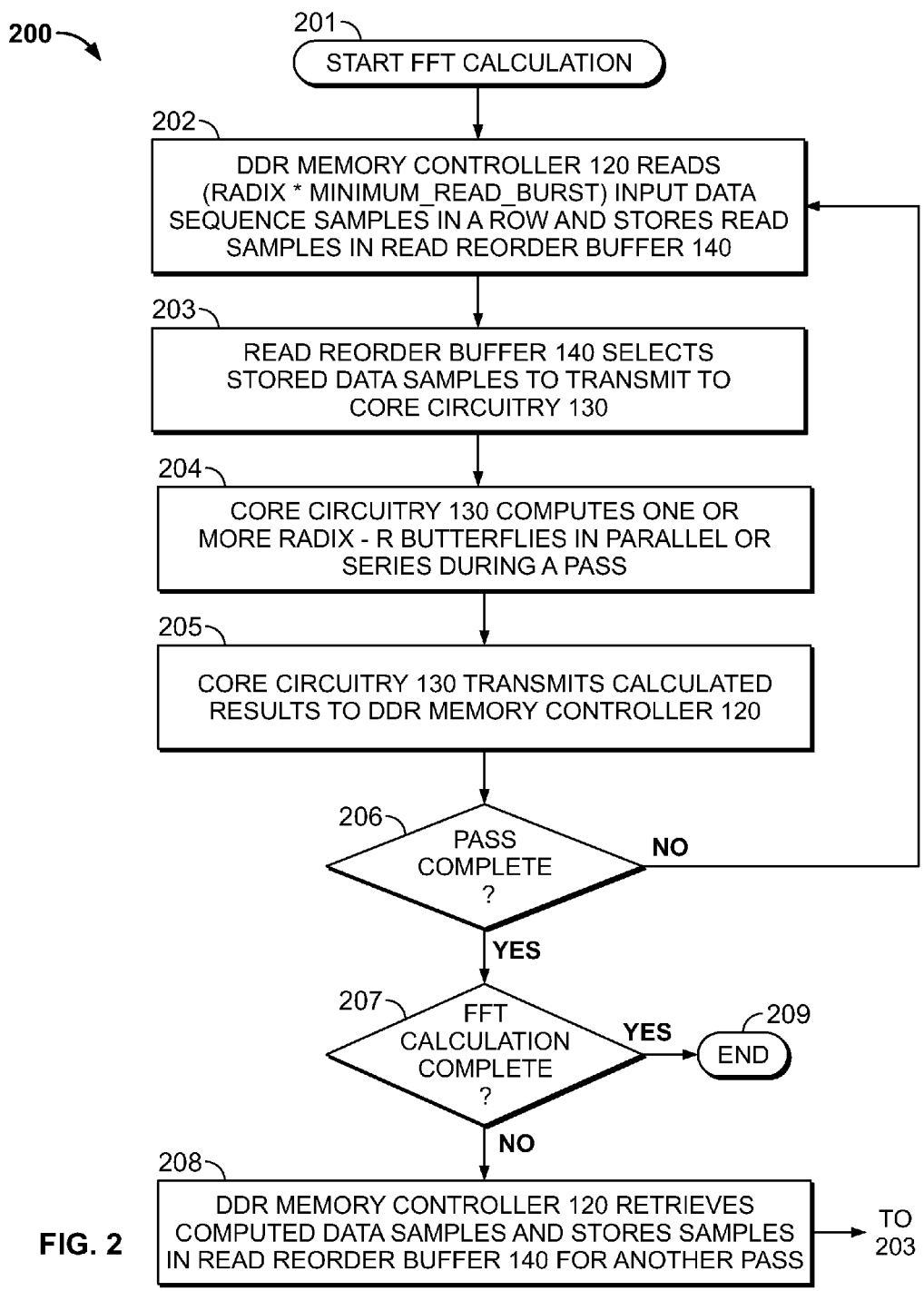
FIG. 2 is an illustrative process for computing an FFT efficiently in accordance with an embodiment of the present invention.

FIG. 2 is an illustrative process for computing an FFT efficiently in accordance with an embodiment of the present invention. FIG. 2 illustrates process 200 for calculating an FFT efficiently using system 100 of FIG. 1. It will be noted that the steps of FIG. 2 may be performed in any suitable order, and one or more steps may be omitted entirely according to the context and application. The following example illustrates the calculation of a 64-point FFT using radix R=4. In this example, an input data sequence x[n], where n=0, . . . ,63, for which an FFT is to be calculated, may initially be stored in DDR memory bank 110. Data samples x[n] may be stored in DDR memory bank 110 in a memory arrangement that is sequential, i.e., where the first data sample is x[0] and the last data sample is x[63]. In this example, each data sample x[n] has a size of 64 bits, corresponding to the minimum unit of transfer for the application making use of the FFT calculation.

At 202, DDR memory controller 120 may read the first R*minimum_read_burst data samples of the input data sequence stored in DDR memory bank 110. For example, when the size of minimum_read_burst is 256 bits (64*4 bits), DDR memory controller 120 reads these data samples in groups of four consecutive data samples at a time. DDR memory controller 120 may read these data samples in an order where the indices corresponding to the data samples are arranged as:

00, 01, 02, 03, 16, 17, 18, 19, 32, 33, 34, 35, 48, 49, 50, 51, 04, 05, 06, 07, 20, 21, 22, 23, . . . , 60, 61, 62, 63;

Four consecutive data samples can be read by DDR memory controller 120 at a time because the size of minimum_read_burst is four times the size of each data sample x[n]. In other embodiments, the size of minimum_read_burst may be five times the size of each data sample x[n]. In this case, DDR memory controller 120 may read data samples of the input data sequence stored in DDR memory bank 110 in the order where the indices corresponding to the data samples are arranged as:

00, 01, 02, 03, 04, 16, 17, 18, 19, 20, 32, 33, 34, 35, 36, 48, 49, 50, 51, 52, 05, 06, 07, 08, 09, 21, 22, 23, 24, 25, . . .

The R*minimum_read_burst data samples read by DDR memory controller 120 may then be input and stored in read reorder buffer 140.

At 203, read reorder buffer 140 selects appropriate data samples to transmit to core circuitry 130 for computing one or more FFT butterflies. For example, at 203, read reorder buffer 140 may select from and transmit data samples corresponding to the groups of indices, as denoted herein by parentheses, (00, 16, 32, 48), (01, 17, 33, 49), (02, 18, 34, 50), and (03, 19, 35, 51) to core circuitry 130 for calculating four radix-4 FFT butterflies.

At 204, core circuitry 130 may calculate radix-R butterflies for a FFT calculation using the data samples received from read reorder buffer 140 in 203. Continuing with the example, at 204, core circuitry 130 may calculate the first four radix-4 butterflies using the data samples received from read reorder buffer 140. In some embodiments the calculation of these butterflies may occur in parallel, in other embodiments, these butterflies may be calculated serially.

At 205, core circuitry 130 may transmit the final or intermediate results of the FFT calculation to DDR memory controller 120. DDR memory controller 120 may unload the results to any other internal or external memory structure or buffer. In some embodiments, steps 202 and 205 may occur in parallel with steps 203 and 204.

At 206, if the current pass of the FFT calculation is not complete, process 200 proceeds to 202. If the current pass of the FFT calculation is complete, process 200 proceeds to 207.

If the FFT calculation is complete, at 207, DDR memory controller 120 may write the final or intermediate results of the FFT calculation back to DDR memory bank 110 and/or it may unload the results to any other internal or external memory structure or buffer, thus ending process 200 at 209. If the FFT calculation is not complete, i.e., more passes are required to complete the calculation, then process 200 proceeds to 208. At 208, DDR memory controller 120 retrieves the data samples corresponding to the intermediate results of the FFT calculation it received from core circuitry 130 at the end of the last pass and transmits the data samples to read reorder buffer 140 for storage. Process 200 may proceed to 203 for further computation.

In some embodiments, process 200 may achieve a memory bandwidth efficiency close to the maximum memory bandwidth efficiency possible from the memory interface. In one exemplary experiment with DDR3 SDRAM memory, memory bandwidth efficiency of 94% has been recorded. An additional benefit of process 200 is that improvements in memory bandwidth efficiency are accompanied by reductions in power consumption. Power consumption is proportional to the number of times that banks of memory are opened (activated) and closed (pre-charged). Since maximizing memory bandwidth efficiency reduces the number of times memory banks are activated and pre-charged, maximizing memory bandwidth efficiency reduces power consumption.

Figure 3:
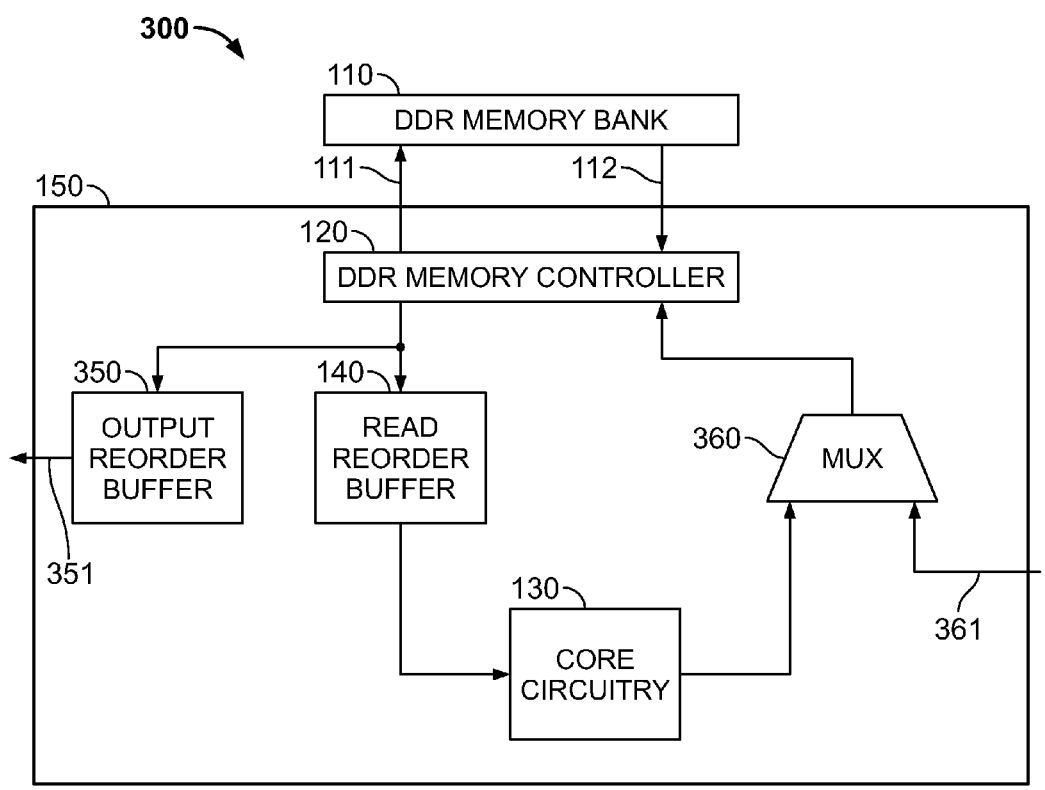
FIG. 3 is a simplified block diagram of an illustrative embodiment of an FFT computation architecture with natural order output in accordance with one embodiment of the present invention.

After all passes of the FFT algorithm are complete, data corresponding to the results of the FFT calculation may be in radix-reversed order. In some embodiments, the natural order, rather than the radix-reversed order may be preferred for output to the application making use of the FFT. In an embodiment, the natural order of the data corresponding to the results of the FFT calculation may correspond to the order in which the input data sequence, whose FFT was calculated, is stored in memory. FIG. 3 is a simplified block diagram of an illustrative embodiment of an FFT computation architecture with natural order output in accordance with one embodiment of the present invention. FIG. 3 shows system 300 for calculating an FFT and outputting the result in natural order as may be desired in some embodiments. System 300 includes DDR memory bank 110, DDR memory controller 120, buses 111 and 112, core circuitry 130, read reorder buffer 140, multiplexer 360, bus 361, output reorder buffer 350, and bus 351.

DDR memory bank 110, DDR memory controller 120, buses 111 and 112, core circuitry 130, and read reorder buffer 140 may each operate substantially similarly to what was described with reference to FIGS. 1 and 2.

Output reorder buffer 350 is connected to DDR memory controller 120 and to bus 351. Output reorder buffer 350 may output data to other external or internal memory structures or buffers using connection 351. For simplicity of presentation, these external and/or internal memory structures or buffers are not shown. In some embodiments, system 300 may include multiplexer 360, which may select between data input from core circuitry 130 or data input from bus 361 and forward the selected input to DDR memory controller 120. In some embodiments, the number of bits transferrable across bus 361 per clock cycle may be variable.

As an illustrative example of the use of system 300, in a 256-point FFT calculated using radix R=16, the radix-reversed order of indices associated with the data samples that may be generated by core circuitry 130 is:

0, 16, 32, 48, 64, . . . , 240, 1, 17, 33, 49, 65, . . . , 241, 2, 18, 34, 50, 66, . . . , 242, . . . ;

and the natural order is:

00, 01, 02, 03, 04, 05, 06, 07, . . . , 252, 253, 254, 255.

The conversion from radix-reversed order to natural order may be performed in two passes by rearranging the memory addresses of the output data samples as explained below. For a 256-point FFT, core circuitry 130 calculates 256 data samples corresponding to the FFT calculation that have to be output. Because there are 256 data samples, 8 bit memory addresses (e.g., of the form [8, 7, 6, 5, 4, 3, 2, 1], where the digits represent bit indices) may be required to access each calculated data sample from memory. To read out the calculated data in the natural order, each memory address may need to be shifted so that, e.g., the high order bits and the low order bits are swapped on the radix boundary (because the radix is R=16, the radix boundary is 4 bits and the form of the 8 bit address would be [4, 3, 2, 1, 8, 7, 6, 5]). Swapping the radix order of the output read addresses during the last pass for natural order output requires shifting bits within memory addresses in a manner identical to the manner in which read reorder buffer 140 shifts bits within memory addresses for read addressing (i.e., the order in which the input data sequence is read) during the first pass. Therefore, the structure of read reorder buffer 140 may be substantially similar to the structure of output reorder buffer 350. Although the example of the procedure to convert the radix-reversed order to natural order is described above for a 256-point FFT with radix R=16, the same procedure may be applied to any N-point FFT that can be decomposed into two passes using equal radix.

Figure 4:
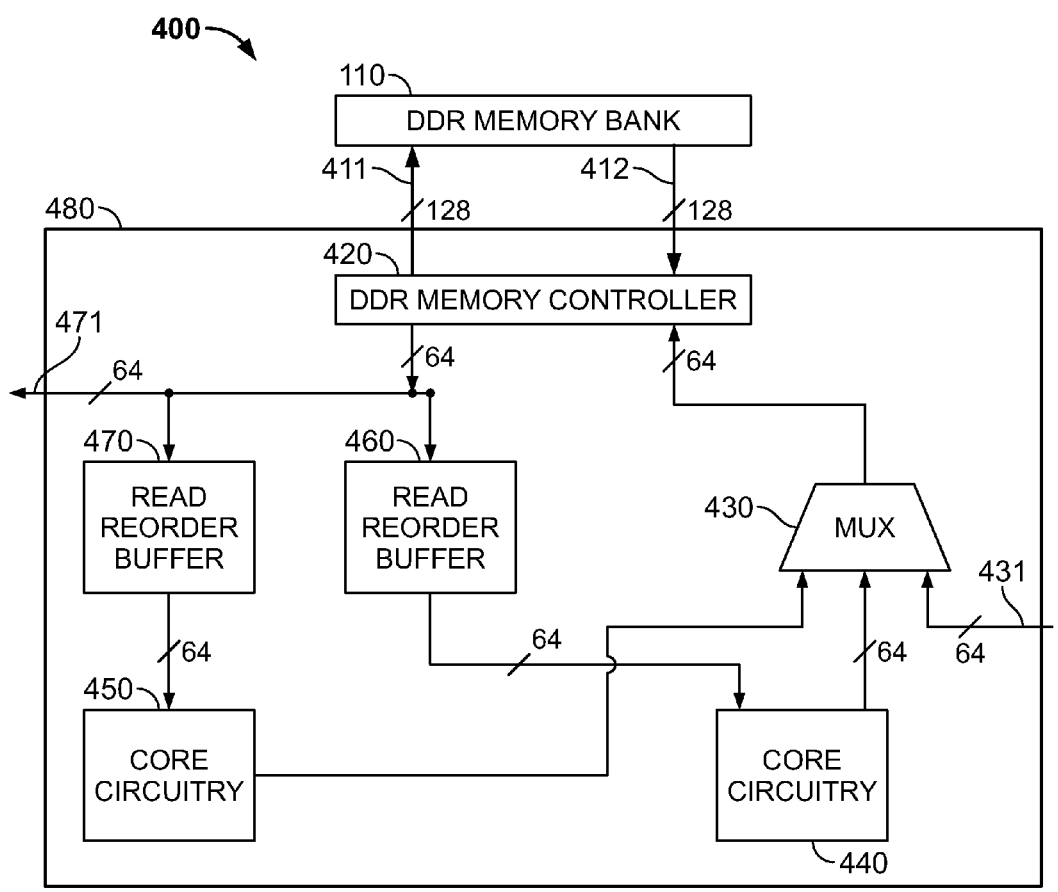
FIG. 4 is a simplified block diagram of an illustrative embodiment of a single precision interleaved FFT computation architecture in accordance with one embodiment of the present invention.

FIG. 4 is a simplified block diagram of an illustrative embodiment of a single precision interleaved FFT computation architecture in accordance with one embodiment of the present invention. FIG. 4 illustrates system 400 for calculating two single precision interleaved FFTs efficiently. The process of interleaving the FFT calculations will be explained later in FIG. 5. In conventional FFT implementations, the duty cycle, i.e., the amount of time that it takes to transfer data in and out of the core circuitry 130 as a percentage of the total FFT processing time, is 33%. System 400 may be used to increase this duty cycle to 66% by computing two single precision FFTs on two separate data sets provided that there are a maximum of two reads and two writes per clock cycle.

It should be noted that a single precision FFT operates on single precision complex numbers, each of which has size 64 bits. In contrast, a double precision FFT operates on double precision complex numbers, each of which has size 128 bits. A single precision FFT requires about half the logic and one fourth of the number of multiplier blocks that a double precision FFT requires. Thus, calculating two single precision FFTs simultaneously will require the same number of logic resources as calculating one double precision FFT.

System 400 includes integrated circuit 480, DDR memory bank 110, DDR memory controller 420, buses 411 and 412, multiplexer 430, bus 431, read reorder buffer 460, read reorder buffer 470, core circuitry 440, core circuitry 450 and bus 471. In some embodiments, DDR memory controller 420, multiplexer 430, core circuitry 450, core circuitry 460, read reorder buffer 460, and read reorder buffer 470 may be located on or in integrated circuit 480. In an embodiment, core circuitry 440 and core circuitry 450 may each be core circuitry. Integrated circuit 480 can be an ASIC, a PLD, an FPGA, or a chip.

The single DDR memory controller 420 may be connected to DDR memory bank 110 through buses 411 and 412, each of is capable of transferring 128 bits at a time between DDR memory controller 420 and DDR memory bank 110. System 400 may also include core circuitry 440 and core circuitry 450. DDR memory controller 420 may be connected to multiplexer 430 which may be configurable to select data from core circuitry 440, core circuitry 450, or from any other external data source via bus 431 and forward the selected data to DDR memory controller 420. For simplicity, the external data source connected to multiplexer 430 through bus 431 is not shown. Multiplexer 430 is connected to DDR memory controller 420 via a bus that can transfer 64 bits per clock cycle. DDR memory controller 420 may be able to unload 64 bits of data per clock cycle using bus 471. In some embodiments, the number of bits transferrable by each of the buses 431 and 471 per clock cycle may be configurable. System 400 also includes read reorder buffer 470 and read reorder buffer 460, each of which is connected to DDR memory controller 420 via a bus that can transfer 64 bits per clock cycle. Read reorder buffer 460 is connected to core circuitry 440 via a bus that can transfer 64 bits per clock cycle and read reorder buffer 470 is connected to core circuitry 450 via a bus that can transfer 64 bits per clock cycle. Core circuitry 440 and core circuitry 450 are both connected to multiplexer 430 via buses that can transfer 64 bits per clock cycle.

System 400 includes a pair each of read reorder buffers 460 and 470 and core circuitries 440 and 450 that are used to calculate the two single precision FFTs separately. For example, data may be processed in 64 bit groups per clock cycle on integrated circuit 480 side and in 128 bit groups per clock cycle on the DDR memory bank 110 side. The operation of each single precision FFT data path is similar to the calculation of one FFT described in process 200 of FIG. 2. For example, a first FFT may be calculated by read reorder buffer 460 and core circuitry 440 in a substantially similar manner as an FFT is calculated by read reorder buffer 140 and core circuitry 130 as described in process 200 of FIG. 2. Similarly, a second FFT may be calculated by read reorder buffer 470 and core circuitry 450 in a substantially similar manner as an FFT is calculated by read reorder buffer 140 and core circuitry 130 as described in process 200 of FIG. 2.

DDR memory controller 420 reads data samples from input data sequences, corresponding to a first and a second FFT calculation respectively, and stores the data samples corresponding to the first FFT calculation in read reorder buffer 460 and the data samples corresponding to the second FFT calculation in read reorder buffer 470. Read reorder buffer 460 may select an appropriate portion of its stored data, e.g., similar to how data is selected by read reorder buffer 140 as shown at 203 in FIG. 2, and transmit the selected data to core circuitry 440. Similarly, read reorder buffer 470 may select an appropriate portion of its stored data and transmit the selected data to core circuitry 450. Read reorder buffer 460 and read reorder buffer 470 may include other circuitry (not shown) to assist in selecting and transmitting the appropriate portions of data. Furthermore, the components are interchangeable and either read reorder buffer 460 and core circuitry 440 or read reorder buffer 470 and core circuitry 450 may be interchangeably used to calculate the first and/or the second FFT.

Interleaving two single precision FFT calculations in this manner utilizes the memory interface more efficiently. Therefore, interleaving may result in more cost effective FFT calculations because while DDR memory maybe inexpensive, the memory interface (e.g., I/O pins used therein) may be expensive. Thus, it may be prudent to efficiently utilize the bandwidth of the memory interface as further detailed below.

Figure 5:
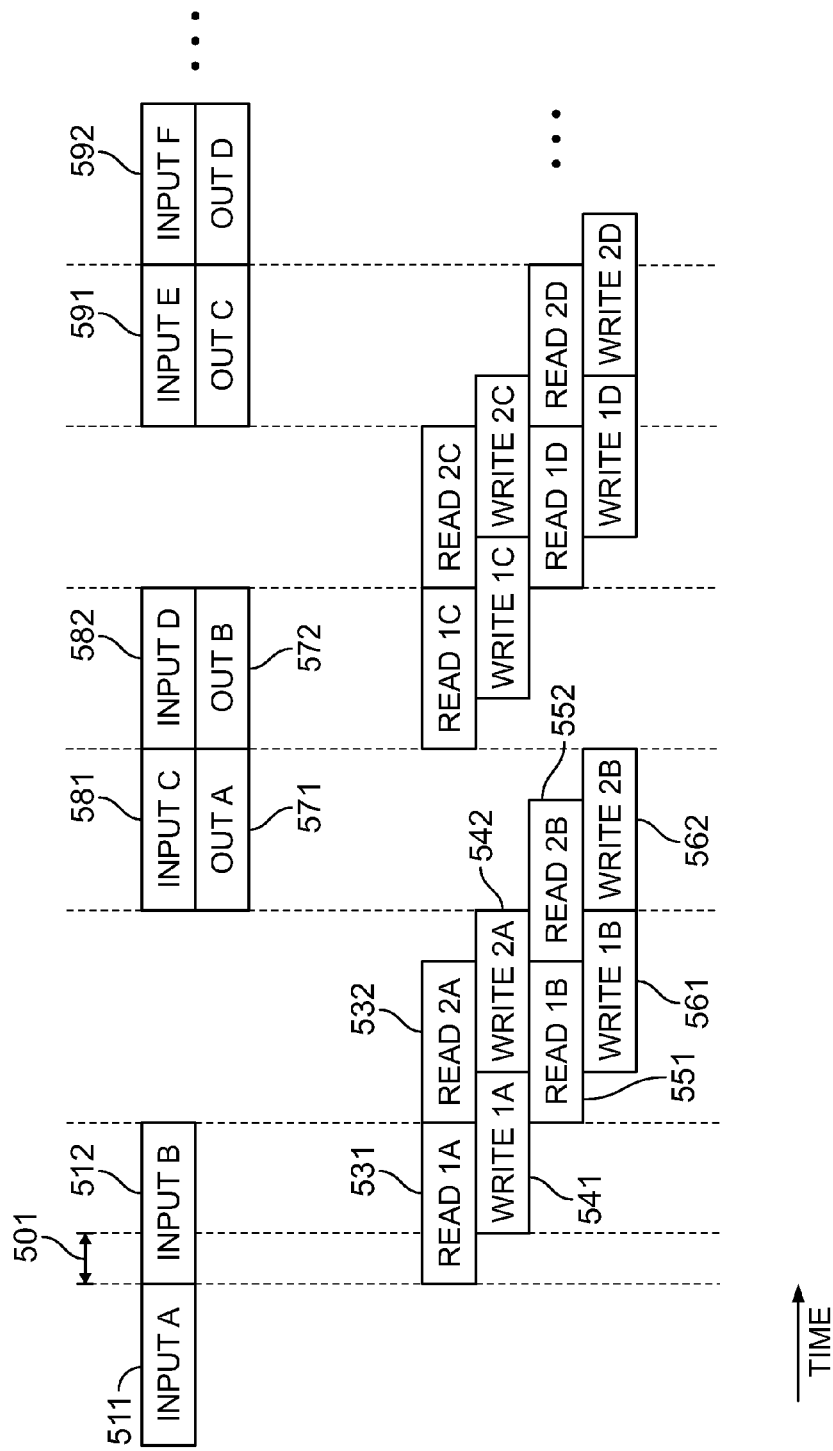
FIG. 5 is an exemplary timing diagram for the computations in a single precision interleaved FFT computation architecture in accordance with one embodiment of the present invention.

FIG. 5 is an exemplary timing diagram for the computations in a single precision interleaved FFT computation architecture in accordance with one embodiment of the present invention, as described in FIG. 4. FIG. 5 illustrates the calculation of a pair of two N-point single precision FFTs across time when two passes are used in the calculation of each FFT. In FIG. 5, time is shows as increasing from left to right. Input A, 511, and input B, 512, denote two N length single precision input data sequences stored in DDR memory bank 110. In one embodiment, read reorder buffer 460 and programmable logic core circuitry 440 may be used to calculate the single precision FFT of input A, 511, and read reorder buffer 470 and programmable logic core circuitry 450 may be used to calculate the single precision FFT of input B, 512.

The calculation of the interleaved FFTs begins by starting a first pass, at the step denoted by Read 1A, 531, after reading input A, 511, from DDR memory bank 110. After a processing delay that may be attributed to the operation of core circuitry, intermediate results from the first pass Read 1A, 531, as calculated by programmable logic core circuitry, may begin to be written at the step denoted by Write 1A, 541. A second pass Read 2A, 532, corresponding to reading the intermediate results written in Write 1A, 541, follows the completion of Read 1A, 531. In an embodiment, second read pass Read 2A, 532, may commence reading the intermediate results written by Write 1A, 541, before Write 1A, 541, is fully complete. The intermediate results of the second pass are written in the step denoted by Write 2A, 542. When the results from the second pass are written in step Write 2A, 542, the FFT calculation for input A, 511, is complete and DDR memory controller 420 can output the calculated FFT data at the step denoted by Out A, 571.

While step Read 2A, 532, is ongoing, the first pass for input B, 512, may begin after reading input B, 512, from DDR memory bank 110. As described above for input A, 511, step Read 2B, 552, corresponding to the second pass for input B, 512, and steps Write 1B, 561, and Write 2B, 562, corresponding respectively to writing the results of the first pass and the second pass, occur. When the results from the second pass are written at step Write 2B, 562, the FFT calculation for input B, 512, is complete and DDR memory controller 420 may output the calculated FFT data at the step denoted as Out B, 572. The above process may then be repeated to calculate the single precision interleaved FFTs of input C 581 and input D, 582, and input E, 591, as well as input F, 592.

FIG. 5 illustrates that at any given time, system 400 can process up to two read operations (e.g., Read 2A, 532, and Read 1B, 551) and up to two write operations (e.g., Write 2A, 542, and Write 1B, 561) simultaneously. Simultaneously processing two read operations and two write operations may be desirable because it can help maximize the bandwidth utilization of the DDR interface. For example, in some embodiments, DDR memory controller 420 may operate at a 533 MHz clock speed but may transfer 64-bits of data per clock cycle at 266 MHz. Then, only 25% of the DDR interface bandwidth may be utilized. Therefore, in order to maximize DDR interface bandwidth utilization, four simultaneous memory accesses may be performed as discussed above.

It should also be noted that FIG. 5 shows the read (e.g., Read 1A, 531, and Read 2A, 532) and write (e.g., Write 1A, 541, and Write 2A, 542) operations for the two passes for each FFT calculation occur continuously, i.e., there is no time gap between the passes. In practice there may be processing latency during each pass and there may, therefore, be a delay between the two passes for each FFT. This processing latency may be due to the operation of the read reorder buffers 460 and 470 and other delays generally associated with the data paths. In some embodiments, there may be a latency between the first read pass (e.g., Read 1A, 531) and the first write pass (e.g., Write 1A, 541) because of core circuitry processing. This is denoted in FIG. 5 as latency 501.

Moreover, a write operation may be taking place for one pass at the same time as a read operation for the next pass is beginning. For example, Write 1A, 541, overlaps in time with Read 2A, 532, as illustrated in FIG. 5. There may be potential conflicts that can occur due to read and write operations that overlap in this way, e.g., when DDR memory controller 420 attempts to read from and write to the same memory address in external memory. However, FIGS. 6A and 6B show that in accordance with the principles of the present disclosure memory accesses for read and write operations may be arranged such that there are no such conflicts.

FIG. 6A is a schematic depicting the first few indices read in the computation of the FFT in accordance with one embodiment of the present invention. It shows the first few memory addresses that are accessed in terms of indices corresponding to the input sequence data samples. These memory addresses are accessed to read in the input data sequence so that its FFT can be calculated. The memory access sequence is arranged in the order proceeding down the rows of each column, starting from the left-most column. FIG. 6B is a schematic showing the last few indices written in the computation of the FFT in accordance with one embodiment of the present invention. It depicts the last few memory addresses that are accessed in terms of indices corresponding to the input sequence data samples. These memory addresses are accessed for writing the results of the FFT calculation. The memory access sequence is arranged in the order proceeding left to right across the columns in each row, starting from the top-most row, since writes are sequential.

A read/write conflict may occur when a memory location on a pass is read before that same memory location is written to on the previous pass. The earliest potential conflict is between the (N-R)th write operation and the Rth read operation. The (N-R)th write operation and the Rth read operations are approximately 2*R clock cycles apart. The data samples read into the read reorder buffer near this potential conflict will be N-R+1, N-R+2, N-R+3, etc., which have the same order as the order in which the write addresses that follow the (N-R)th write operation. It follows that if there is no conflict between the (N-R)th write operation and the Rth read operation then there will be no conflict with the following addresses either. The latency introduced by the read reorder buffer may be ignored because it will introduce a fixed latency to each pass. In particular, while this may delay the write operations, it also delays the read operations by an identical amount. However, the latency of the data path matters. For example, if the radix is R=1024 (1K), the data path latency will be less than 2*R clock cycles. If the radix is 16, the data path latency will be much larger than 2*R clock cycles.

For example, in N-point FFTs where N is large (e.g., where N is 262144 (256K) or larger) the radix, R, should be set as high as possible in order to reduce the number of passes required to complete the FFT calculation. This is advantageous because it reduces the memory interface usage, thus improving power efficiency and memory bandwidth efficiency. In some embodiments, a 256K-point FFT can be calculated in two passes using the radix R=512. In other embodiments, a 1048576-point (1M-point) FFT can be calculated in two passes using the radix R=1024. In still other embodiments, a 16M-point FFT can be calculated in two passes using the radix R=4096 (4K). Limiting the number of passes to two is additionally desirable because current FPGAs, even those that are moderately sized, can provide the memory and computation resources for calculating even very large N-point FFTs. However, in certain embodiments, when N may be very large or when fewer resources may be available, more than two passes may be used to calculate the N-point FFT.

Figure 7:
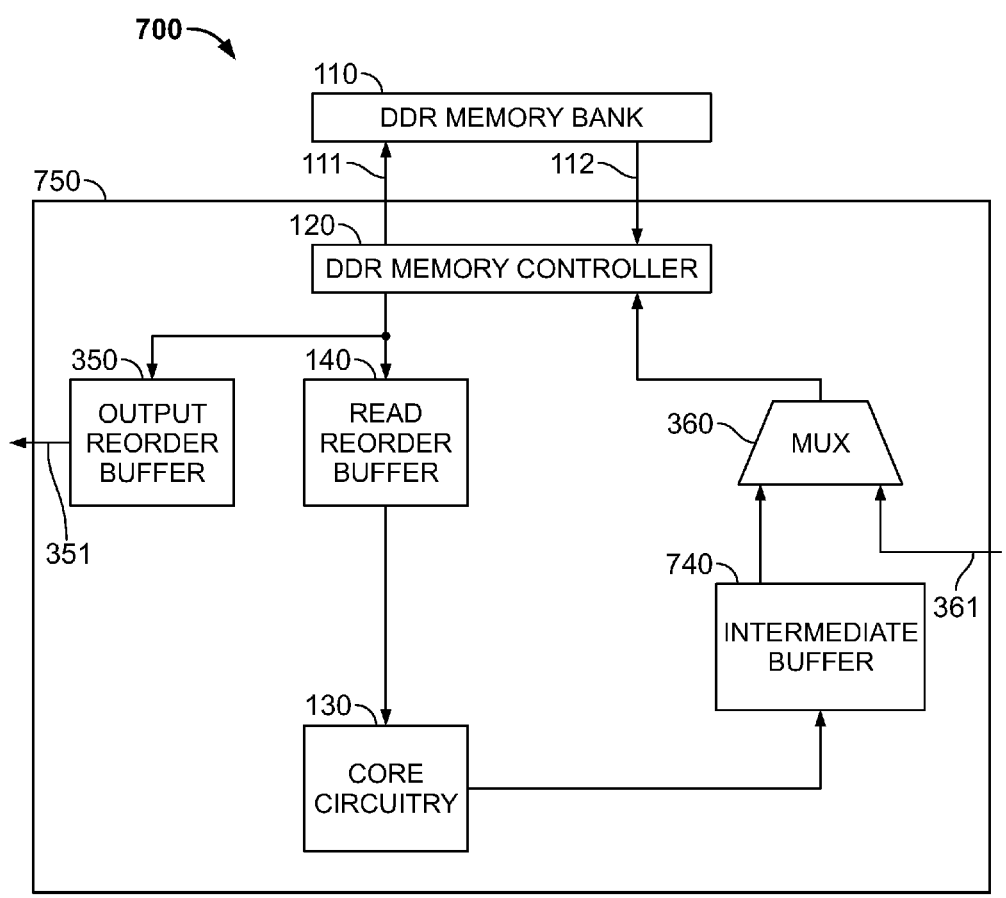
FIG. 7 is a simplified block diagram of an illustrative embodiment of a three pass natural order FFT computation architecture in accordance with one embodiment of the present invention.

FIG. 7 is a simplified block diagram of an illustrative embodiment of a three pass natural order FFT computation architecture in accordance with one embodiment of the present invention. FIG. 7 illustrates system 700 for calculating the FFT using three passes. System 700 includes DDR memory bank 110 and integrated circuit 750. Integrated circuit 750 is connected to DDR memory bank 110 using buses 111 and 112. Integrated circuit 750 may include DDR memory controller 120, read reorder buffer 140, output reorder buffer 350, bus 351, core circuitry 130, multiplexer 360, and bus 361.

DDR memory bank 110, integrated circuit 750, buses 111 and 112, DDR memory controller 120, read reorder buffer 140, output reorder buffer 350, bus 351, and core circuitry 130 may each operate substantially similarly to what was described with reference to FIGS. 1-3.

System 700 also includes an intermediate buffer 740 that may make it cost effective to output the calculated data in natural order output. Intermediate buffer 740 is connected to core circuitry 130 and to multiplexer 360. In some embodiments, intermediate buffer 740 may only be used on the last pass of the FFT calculation. In some embodiments, intermediate buffer 740 may include additional circuitry (not shown) that may assist it in selecting and transmitting portions of data stored within it. In an embodiment, multiplexer 360 may select between data input from intermediate buffer 740 or data input from bus 361 and forward the selected input to DDR memory controller 120.

For illustration, the operation and utility of system 700 may be understood through the following example where a 256K-point FFT using the radix R=64 is calculated. For a 256K-point FFT, core circuitry 130 calculates 256K output data samples. Because there are 256K output data samples, 18 bit memory addresses are required (e.g., of the form [18, 17, 16, 15, . . . , 4, 3, 2, 1], where the digits represent bit indices), to access each calculated data sample from memory. For exposition and notational convenience, an 18 bit memory address is expressed as [18:13][12:7][6:1]. To obtain the calculated FFT data in the natural order output after the last pass, bit reordering to [6:1][12:7][18:13] is required. Intermediate buffer 740 may be used to derive such a natural order output.

It can be costly to implement a natural order output of the calculated FFT data without an intermediate reorder buffer 740. For example, if the radix-reversed order is applied directly to the calculated FFT data, the read address sequence, in terms of the indices corresponding to the output data samples, would be:

0, 4096, 8192, 12288, 16384, 20480, . . . , 258048, 64, 4150, . . .

Thus, in a direct implementation where no intermediate buffer is used, the output reorder buffer would have to have size large enough to accommodate at least minimum_read_burst*R^2+1 data samples. When the radix is large (e.g., R=1024), supporting a buffer of such size may be beyond the capabilities of current FPGAs or other programmable logic devices. The use of intermediate buffer 740 may be beneficial in such cases.

In one embodiment the first two passes may be completed as usual without the use of intermediate buffer 740. However, in the last pass, intermediate buffer 740 may be used. The addressing scheme used by intermediate buffer 740 may be [18:13][6:1][12:7]. When the DDR memory controller 120 unloads the calculated FFT data, output reorder buffer 350 may apply another reordering of the address, this time using [12:7][6:1][18:13]. As this address reordering is applied to the locations of the intermediate data, the reordering of the original data sequence will be [6:1][12:7][18:13], which is the desired sequence. Thus, the size of intermediate reorder buffer 740 and output reorder buffer 350 may be identically 2*((R−1)*minimum_read_burst+1), which is far smaller than the buffer size required in the direct implementation. This is accomplished by breaking down the task of reordering the calculated data in to two smaller sub-problems as described above.

Figure 8:
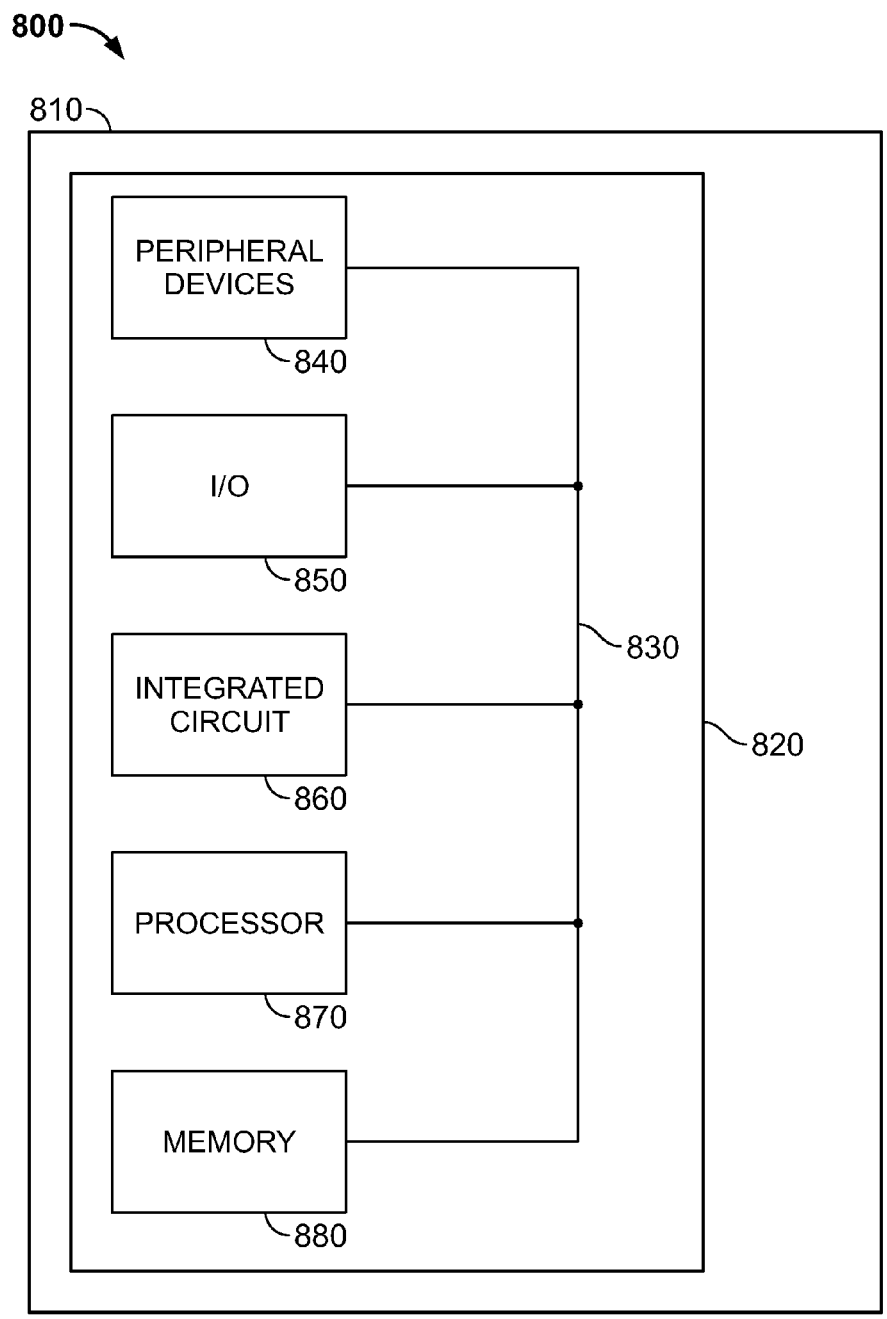
FIG. 8 is a simplified block diagram of an illustrative system employing an integrated circuit incorporating an embodiment of an FFT computation architecture disclosed herein in accordance with one embodiment of the present invention.

FIG. 8 is a simplified block diagram of an illustrative system employing an integrated circuit incorporating an embodiment of an FFT computation architecture disclosed herein in accordance with one embodiment of the present invention. FIG. 8 illustrates integrated circuit 860 or other device (e.g., ASSP, ASIC, full-custom chip, dedicated chip) which includes embodiments of the FFT architectures described herein within a data processing system 800. Data processing system 800 can include one or more of the following components: a processor 870, memory 880, I/O circuitry 850, and peripheral devices 840. These components are coupled together by a system bus or other interconnections 830 and are populated on a circuit board 820 which is contained in an end-user system 810.

System 800 could be used in a wide variety of applications, such as computer networking, data networking, instrumentation, video processing, digital signal processing, or any other application where the advantage of using programmable or reprogrammable logic is desirable. Integrated circuit 860 can be used to perform a variety of different logic functions. For example, integrated circuit 860 can be configured as a processor or controller that works in cooperation with processor 870. Integrated circuit 860 may also be used as an arbiter for arbitrating access to a shared resource in system 800. In yet another example, integrated circuit 860 can be configured as an interface between processor 870 and one of the other components in system 800. It should be noted that system 800 is only exemplary, and that the true scope and spirit of the invention should be indicated by the following claims.

Although components in the above disclosure are described as being connected with one another, they may instead be coupled to one another, possibly via other components in between them. It will be understood that the foregoing are only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

What is claimed is:

1. A method for efficiently transferring data samples stored in a memory for calculating Fast Fourier Transforms (FFTs), the method comprising:
   storing a first set of the data samples in a first read reorder buffer, wherein the first set of the data samples corresponds to a first set of indices;
   selecting, using the first read reorder buffer, a first portion of the first set of the data samples, wherein the first portion of the first set of data samples corresponds to a second set of indices;
   transmitting, using the first read reorder buffer, the first portion of the first set of the data samples to a first circuit; and
   processing, using the first circuit, the first portion of the first set of the data samples in response to the transmitting the first portion using the first read reorder buffer, wherein the processing includes calculating output data samples corresponding to a part of a first FFT.

2. The method of claim 1 further comprising selecting, using the first read reorder buffer, the first portion of the first set of the data samples such that the second set of indices is selected in accordance with a radix-reversed sequence associated with the first FFT.

3. The method of claim 2, wherein the radix-reversed sequence denotes a sequence of indices, wherein each index is separated from a previous index by a distance that is a function of a radix, wherein the radix is a fixed value.

4. The method of claim 1, wherein the calculation of the output data samples corresponding to the part of the first FFT requires a variable number of passes.

5. The method of claim 4, wherein the data samples stored in the memory are read sequentially in each pass of the variable number of passes required for the calculation of the first FFT.

6. The method of claim 1 further comprising:
   storing, in an output reorder buffer, the output data samples corresponding to the part of the first FFT; and
   selecting, using the output reorder buffer, a second portion of the stored output data samples, wherein the selecting using the output reorder buffer is according to a natural order of the output data samples corresponding to the part of the first FFT; and
   outputting the natural order of the output data samples corresponding to the part of the first FFT.

7. The method of claim 1 further comprising:
   receiving, at an intermediate reorder buffer, the output data samples corresponding to the part of the first FFT;
   storing, in the intermediate reorder buffer, the output data samples, wherein the intermediate reorder buffer is operable to select a second portion of the stored output data samples according to a natural order of the output data samples;
   transmitting the selected output data samples to the memory;
   selecting, using an output reorder buffer, a third portion of the output data samples stored in the memory according to the natural order of the output data samples; and outputting the natural order of the output data samples corresponding to the part of the first FFT.

8. The method of claim 7, wherein the intermediate reorder buffer has substantially the same size as the first read reorder buffer.

9. The method of claim 1 further comprising:
calculating a second FFT in an interleaved manner with the calculation of the first FFT;
storing, in a second read reorder buffer, a second set of the data samples, wherein the second set of the data samples correspond to a third set of indices;
selecting, using the second read reorder buffer, a second portion of the second set of the data samples, wherein the second portion of the second set of data samples correspond to a fourth set of indices;
transmitting, using the second read reorder buffer, the second portion of the second set of the data samples to a second circuit; and
processing, using the second circuit, the second portion of the second set of the data samples in response to the transmitting the second portion using the second read reorder buffer, wherein the processing includes calculating output data samples corresponding to the part of the second FFT.

10. An apparatus for efficiently transferring data samples stored in a memory for calculating Fast Fourier Transforms (FFTs), the apparatus comprising:
a first read reorder buffer;
a memory interface that is operable to:
read data samples stored in the memory, and
store, in the first read reorder buffer, a first set of the data samples, wherein the first read reorder buffer is operable to select a first portion of the first set of the data samples, and wherein the first set of the data samples corresponds to a first set of indices and the first portion of the first set of data samples corresponds to a second set of indices; and
a first circuit that is operable to:
process the first portion of the first set of the data samples in response to receiving the first portion from the first read reorder buffer, and
output data samples corresponding to a part of a first FFT.

11. The apparatus of claim 10, wherein the first read reorder buffer is further operable to select the first portion of the first set of the data samples such that the second set of indices are selected in accordance with a radix-reversed sequence associated with the first FFT.

12. The apparatus of claim 10 further comprising:
an output reorder buffer that is operable to:
store the output data samples corresponding to the part of the first FFT,
select a second portion of the stored output data samples according to a natural order of the output data samples corresponding to the part of the first FFT, and
output the natural order of the output data samples corresponding to the part of the first FFT.

13. The apparatus of claim 12 further comprising an intermediate reorder buffer that is operable to:
receive, from the first circuit, the output data samples corresponding to the part of the first FFT;
store, in the intermediate reorder buffer, the received output data samples;
select a third portion of the stored output data samples according to the natural order of the output data samples; and
transmit the selected output data samples to the memory for storage, wherein the output reorder buffer is operable to:
select a fourth portion of the output data samples stored in the memory according to the natural order of the output data samples, and
output the natural order of the output data samples corresponding to the part of the first FFT.

14. The apparatus of claim 10 further comprising:
a second read reorder buffer, wherein the memory interface is further operable to store a second set of the data samples in the second read reorder buffer, and wherein the second read reorder buffer is operable to select a second portion of the second set of the data samples; and
a second circuit that is operable to:
process the second portion of the second set of the data samples in response to receiving the second portion from the second read reorder buffer, and
output data samples corresponding to a part of a second FFT.

15. The apparatus of claim 10 further comprising a multiplexer that is operable to receive the output data samples corresponding to the part of the first FFT and transmit the output data samples to the memory interface.

16. The apparatus of claim 10, wherein the first read reorder buffer is coupled to the first circuit and the memory interface.

17. An integrated circuit device comprising:
a plurality of read reorder buffers;
core circuitry; and
a memory interface coupled to at least one of the plurality of read reorder buffers and to a memory, wherein the memory interface is operable to:
read data samples stored in the memory, and
store a first set of the data samples in the at least one of the plurality of read reorder buffers, wherein the first set of the data samples corresponds to a first set of indices, and wherein the at least one of the plurality of read reorder buffers is operable to:
select a first portion of the first set of the data samples, wherein the first portion of the data samples corresponds to a second set of indices, and
transmit the first portion of the first set of the data samples to the core circuitry.

18. The integrated circuit of claim 17, wherein the core circuitry is operable to:
receive the first portion of the first set of the data samples from the at least one of the plurality of read reorder buffers, and
calculate output data samples corresponding to a part of a first FFT.

19. The integrated circuit of claim 18 further comprising an output reorder buffer operable to:
store, in the output reorder buffer, the output data samples corresponding to the part of the first FFT,
select a second portion of the stored output data samples according to a natural order of the output data samples corresponding to the part of the first FFT, and
output the natural order of the output data samples corresponding to the part of the first FFT.

20. The integrated circuit of claim 17 further configured to select the first portion of the first set of the data samples stored in the at least one of the plurality of read reorder buffers by selecting the second set of indices in accordance with a radix-reversed sequence associated with the first FFT.

* * * * *